US006965083B2

(12) United States Patent
Reiser

(10) Patent No.: US 6,965,083 B2
(45) Date of Patent: Nov. 15, 2005

(54) SCALE FOR WEIGHING BLISTER PACKS THAT CONTAIN POWDER

(75) Inventor: Manfred Reiser, Winnenden (DE)

(73) Assignee: Harro Hofliger Verpackungsmaschinen GmbH, Allmersbach im Tal (DE)

( * ) Notice: Subject to any disclaimer, the term of this patent is extended or adjusted under 35 U.S.C. 154(b) by 0 days.

(21) Appl. No.: 10/663,233

(22) Filed: Sep. 15, 2003

(65) Prior Publication Data

US 2004/0055792 A1   Mar. 25, 2004

Related U.S. Application Data

(63) Continuation of application No. PCT/DE02/00767, filed on Mar. 1, 2002.

(30) Foreign Application Priority Data

Mar. 14, 2001   (DE) .......................... 201 04 455 U

(51) Int. Cl.[7] ........................................... G01G 21/28
(52) U.S. Cl. ..................................... 177/238
(58) Field of Search ............................. 177/180, 181, 177/238

(56) References Cited

U.S. PATENT DOCUMENTS

| 4,291,775 A | * | 9/1981 | Collins .......................... 374/14 |
| 4,619,337 A |   | 10/1986 | Behrend et al. ......... 177/210 R |
| 4,821,821 A | * | 4/1989 | Kelley .......................... 177/181 |
| 5,869,788 A | * | 2/1999 | Gordon et al. ............... 177/124 |

FOREIGN PATENT DOCUMENTS

| CH | 678570 | 9/1991 |
| DE | 201 04 455 | 3/2001 |
| EP | 0 685 714 A1 | 12/1995 |
| WO | WO-01/33176 A1 | 5/2001 |
| WO | WO-01/60695 A1 | 8/2001 |

OTHER PUBLICATIONS

Patent Abstracts of Japan; vol. 2000, No. 13, Feb. 5, 2001; Publication No. JP 2000 272717; Kuwano Tatsunari.

* cited by examiner

*Primary Examiner*—Randy W. Gibson
(74) *Attorney, Agent, or Firm*—Darby & Darby

(57) ABSTRACT

In a balance (10) for weighing blister packs (50) in the microgram weight range, its balance pan (12, 14) is designed in such a way that field forces (70) caused by an electric field act practically exclusively on the balance pan (12, 14), said field being generated by an electrically charged blister pack (50) lying on the balance pan.

19 Claims, 1 Drawing Sheet

SCALE FOR WEIGHING BLISTER PACKS THAT CONTAIN POWDER

This application is a Continuation of International Patent Application Ser. No. PCT/DE02/00767, filed Mar. 1, 2002, which published in German on Sep. 19, 2002 as WO 02/073143 A1.

TECHNICAL FIELD

The present invention relates to a balance with which it is possible to weigh blister packs filled with powder. Because of the very small quantity of the powder to be incorporated into an individual blister pack, and because of the very small admissible weight tolerances for the powder, the balance must be able to operate in the microgram weight range. The powders packaged in such blister packs may be powerful medicines. This generally entails very small admissible weight deviations from a predetermined desired weight of the powder packaged in an individual blister pack.

PRIOR ART

Balances which operate very precisely even in the microgram weight range are known. Such balances could in principle also be used for checking the correct amount of powders packaged in an airtight manner in blister packs. However, in practical trials, extremely different weighing results have been obtained for comparable blister packs. Thus, the maximum weight deviation found was up to 100% (percent) of the amount of powder to be incorporated in each case in a blister pack. In medical engineering in particular, however, only weight deviations of a few percent of the filling weight are tolerated.

DISCLOSURE OF THE INVENTION

Starting from this already known background, the object of the invention is to make available a balance of the type mentioned at the outset for weighing blister packs, with which balance it is possible to detect very small weight deviations of the order of about 0.5% to 1% of the respective weight of the incorporated powder.

This invention is defined by the features of claim 1. Developments of the invention are the subject of the further claims. The invention is based on the recognition that the very considerable weight differences which have occurred in practice are caused not by correspondingly great differences in the amounts of powder incorporated, but by static charging of the weighed blister packs. This is because the blister packs are as a rule usually made of a material, including multi-layered material, whose constituents are made up of electrically chargeable plastic material or at least contain such material.

In order to check the correct amount of powders to be packaged in an airtight manner in blister packs, it is proposed, according to the invention, to design the balance pan of the balance in question in such a way that field forces which occur act practically exclusively on the balance pan. These field forces are caused by an electric field which is generated by an electrically charged blister pack lying on the balance pan of this balance. The field forces arising through the electrical charging of the blister pack therefore act on the balance pan and their effect on the weighing result is thus neutralized. This is because these forces cannot act on fixed parts of the balance distinct from the balance pan and its support.

It has proven expedient to provide the balance pan with a body which is designed such that it can interact with an electric field emanating from the blister pack. Such a body is preferably grounded so that the electric field can be safely led off.

According to a particularly advantageous development of the invention, the body is designed as a plate or, in particular, as a cage. In the latter case, the cage is arranged spatially with respect to the balance pan, and fixed thereon, in such a way that the blister pack to be weighed can be placed in the inside of the cage. In contrast to a plate, the cage form has the advantage that the field forces can be taken up in practically all directions by the cage and thus have no effect on the weighing result.

The cage is advantageously provided with an opening through which the at least one blister pack to be weighed can be guided and through which it can once again be removed from the cage. To ensure that the material to be weighed is received in a stable manner, the balance pan is designed as a three-point support for the blister packs to be weighed.

It has also proven advantageous to provide a windproof housing at least for the area of the balance pan, such that this housing can serve as a wind protection for the at least one blister pack lying on the balance pan. This windproof housing is preferably made of grounded metal or of glass metallized to be electrically conductive.

Using this balance for the difficult task of checking blister packs to determine whether they contain the correct amount of powder provided has proven particularly advantageous as follows.

From a series of blister packs to be packed in an airtight manner with powder, only a specific percentage of these blister packs is checked (in-process control by destructive testing). This means that only a proportion of blister packs is checked. All blister packs in this series are evaluated as being good blister packs, i.e. as usable blister packs, only if the weight result of the check does not exceed a predetermined tolerance value. If the tolerance value is exceeded, the whole series of blister packs is rejected.

In particular, the procedure for checking that the correct amount of powder has been packed in an airtight manner in blister packs can be effected as follows:

The airtight shell of the at least one blister pack to be checked is at least opened so far, or is destroyed, so that the powder is no longer packaged in an airtight manner. This has the advantage that it is possible to eliminate any excess air pressure or underpressure in the blister pack which could distort the weighing results. Next, the gross weight of this at least one blister pack is determined and the powder is then removed from the packs. Thereafter, the net weight of this at least one blister pack is determined. This net weight obtained by the difference between the gross weight and tare weight is compared with the desired weight of the powder to be filled into a blister pack.

If the net weight does not fall short of or exceed the desired weight, which is reduced or increased by a tolerance weight, this blister pack, which was originally packed with powder and has been checked, is assessed as being a good blister pack. Otherwise, if the tolerance weight is not observed, the other blister packs from the same series as this checked blister pack are also assessed as not good, i.e. as blister packs to be rejected.

Further details and advantages of the invention can be taken from the features set out in the claims and from the illustrative embodiment described below.

BRIEF DESCRIPTION OF THE DRAWING

The invention is described and explained in more detail below with reference to the illustrative embodiment shown in the drawing, in which.

EMBODIMENTS OF THE INVENTION

Figure 1:
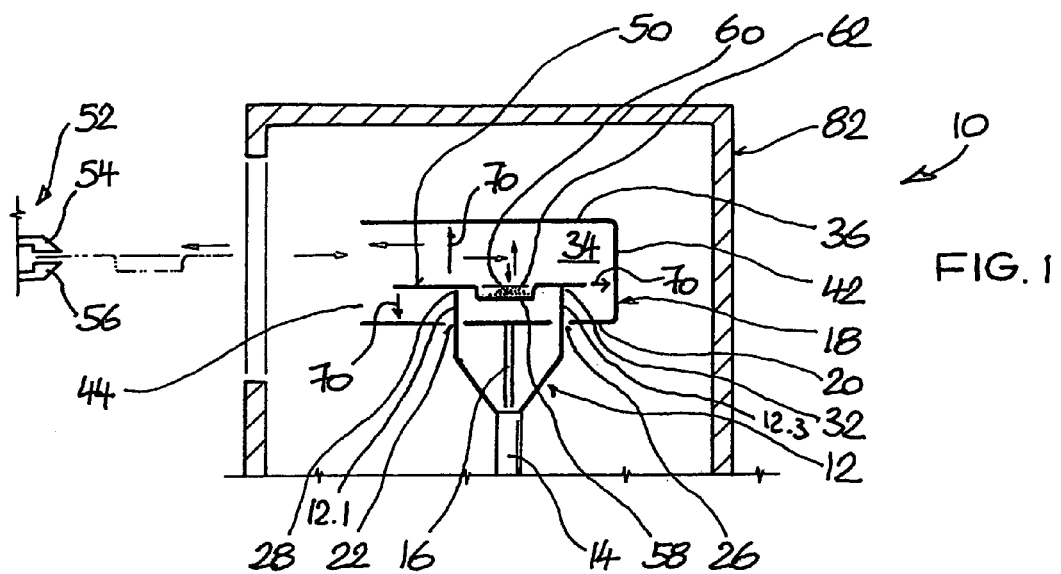
FIG. 1 shows a view of the balance according to the invention in the area of its balance pan.
Figure 2:
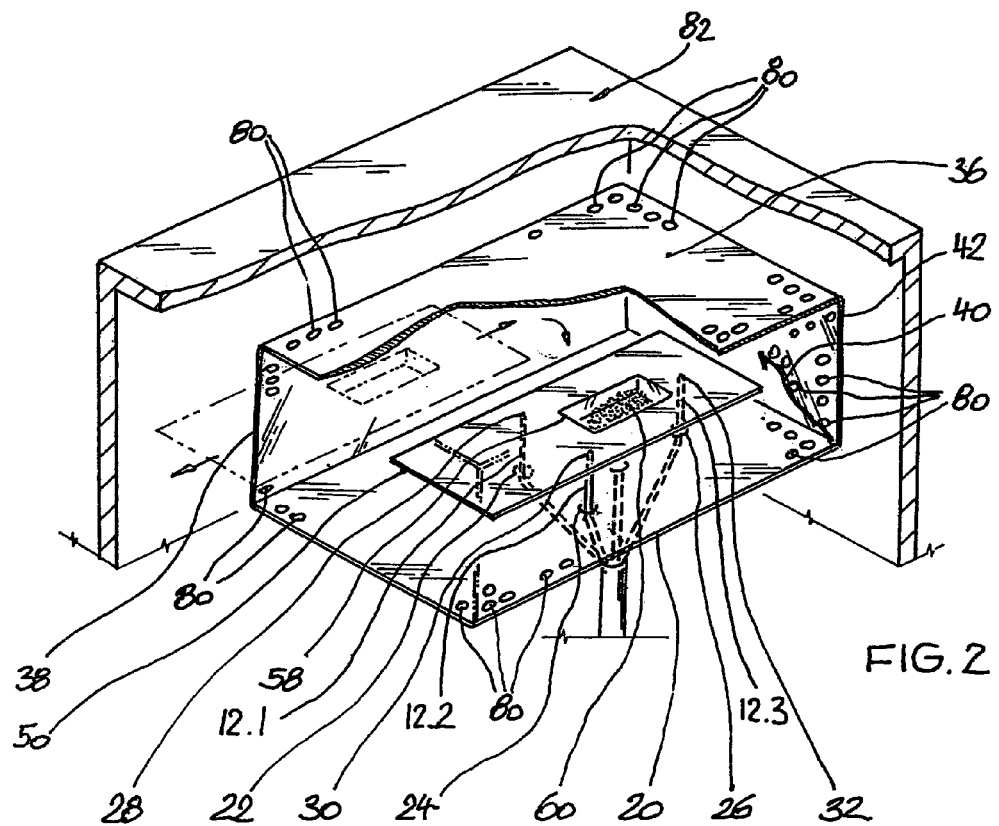
FIG. 2 shows a perspective view of the balance section shown in FIG. 1.

A balance 10 has a balance pan in the form of a tripod 12 provided at the end of a pan rod 14. A cuboid cage 18 is secured on a support piece 16 protruding upward on the pan rod 14. Three cutouts 22, 24, 26 are present in the bottom plate 20 of this cage 18. Through each of these three cutouts 22, 24, 26 there projects a leg 12.1, 12.2, 12.3 of the tripod 12. The points 28, 30, 32 of the tripod 12 thus end in the inside 34 of the cage 18.

The cage has a bottom plate 20 and a top plate 36, and two side walls 38, 40 connecting these two plates 20, 36. On the rear, the cage is closed off by a rear wall 42. On the front face 44 lying opposite the rear wall 42, the cage is open. A blister pack 50 can be passed through this front face 44 into the cage 18 and there be placed on the three legs 12.1, 12.2, 12.3 of the tripod 12 and it can be picked up from the tripod 12 and removed from the cage 18. In doing this, the blister pack 50 is maneuvered by means of tongs 52 whose two clamping jaws 54, 56 are shown diagrammatically in FIG. 1. The three legs 12.1, 12.2, 12.3 could also protrude from the bottom plate 20 to the blister pack 50 and for example then consist of raised parts of the bottom plate 20. The cutouts 22, 24, 26 would then not need to be present.

The blister pack 50 has a cup-shaped depression 58 in which powder 60 can be incorporated. When incorporated, the powder 60 is closed off by a top film 62 of the blister pack 50 so that the powder 60 is then incorporated in an airtight manner in the depression 58.

The blister pack 50 is weighed twice in the present case. The first time, the blister pack 50 is weighed with the powder 60. This state is shown in the drawing. The weighing is carried out with the top film 62 pierced, so that the air pressure present in the inside of the depression 58 is the same as that present outside the blister pack 50. Inaccuracies in the weighing result caused by underpressure or overpressure possibly present in the pack are therefore eliminated.

When maneuvering the blister pack 50, it is not possible to avoid static charging of the pack. The field forces which arise are indicated by arrows 70 (FIG. 1). These field forces act on the outside of the cage 18. Since the weight of the cage 18 is supported on the pan rod 14 on which the weight of the blister pack 50 is also supported via the tripod 12, the field forces caused by an electric field generated by the electrically charged blister pack 50 lying on the tripod 12 have no effect on the weighing result.

To reduce the dead load to be supported by a pan rod 14, the outside walls of the cage 18 have cutouts 80 which save material and thus also reduce the weight of the cage 18. These cutouts 80 can be provided by using wire lattice or perforated metal sheets. Only some of these cutouts 80 are indicated in the drawing.

As has already been mentioned, the blister pack 50 is weighed once in the state shown in the drawing, that is to say with the powder 60 incorporated. Thereafter, the powder 60 is removed from the blister pack 50, and the blister pack 50 is weighed without powder. The weight difference between the two weighings constitutes the net weight and represents the weight of the powder 60.

The area of the cage 18 is surrounded by a windproof housing 82 which serves as a wind protection and which is made of an electrically conductive material.

What is claimed is:

1. A balance for weighing blister packs in the microgram weight range, comprising:

A chargeable material incorporated into at least one blister pack to be weighed;

a balance pan of said balance on which the at least one blister pack to be weighed can be placed, said balance pan being designed in such a way that field forces caused by an electric field generated by an electrical charge on the blister pack material acts on the balance pan when the blister pack is lying on the balance pan; and a body interacting with an electric field emanating from the at least one blister pack is secured as a load on the balance pan.

2. The balance as claimed in claim 1 wherein the balance pan is grounded.

3. The balance as claimed in claim 1 wherein the body is designed as a cage, such that the at least one blister pack resting ont he balance pan is present inside the cage.

4. The balance as claimed in claim 3, wherein the cage has an opening through which the at least one blister pack to be weighed can be guided into the cage and can be removed again from the cage.

5. The balance as claimed in claim 3 wherein the cage comprises walls with material cutouts.

6. The balance as claimed in claim 5, wherein the walls of the cage comprise a material selected from the group consisting of perforated sheet metal and wire lattice.

7. The balance as claimed in claim 1 wherein the balance pan has a three-point support for the at least one blister pack to be weighed.

8. The balance as claimed in claim 7, wherein the three-point support comprises, the three legs which are guided through cutouts in the bottom wall of the cage.

9. The balance as claimed in claim 1 wherein the body comprises a three-point support for the at least one blister pack to be weighed.

10. The balance as claimed in claim 9, wherein the three-point support comprises three legs which are raised parts of the bottom wall of the cage.

11. The balance as claimed in claim 1 wherein a windproof housing is provided at least for the area of the balance pan, such that the housing acts as wind protection for the at least one blister pack lying on the balance pan.

12. The balance as claimed in claim 11, wherein the windproof housing is electrically conductive and is grounded.

13. The balance as claimed in claim 12, wherein the windproof housing comprises a material selected from the group consisting of grounded metal and glass metallized to be electrically conductive.

14. The balance as claimed in claim 1 wherein the body is grounded.

15. The balance as claimed in claim 1 wherein the body is grounded.

16. The balance as claimed in claim 4 wherein the walls of the cage comprise material cutouts.

17. The balance as claimed in claim 5, wherein the walls of the cage comprise a material selected from the group consisting of perforated sheet metal and wire lattice.

18. The balance as claimed in claim 1 wherein the cage, comprises a three-point support for the at least one blister pack to be weighed.

19. The balance as claimed in claim 18, wherein the three-point support comprises three legs formed from raised parts of the bottom plate of the cage.

* * * * *